United States Patent [19]

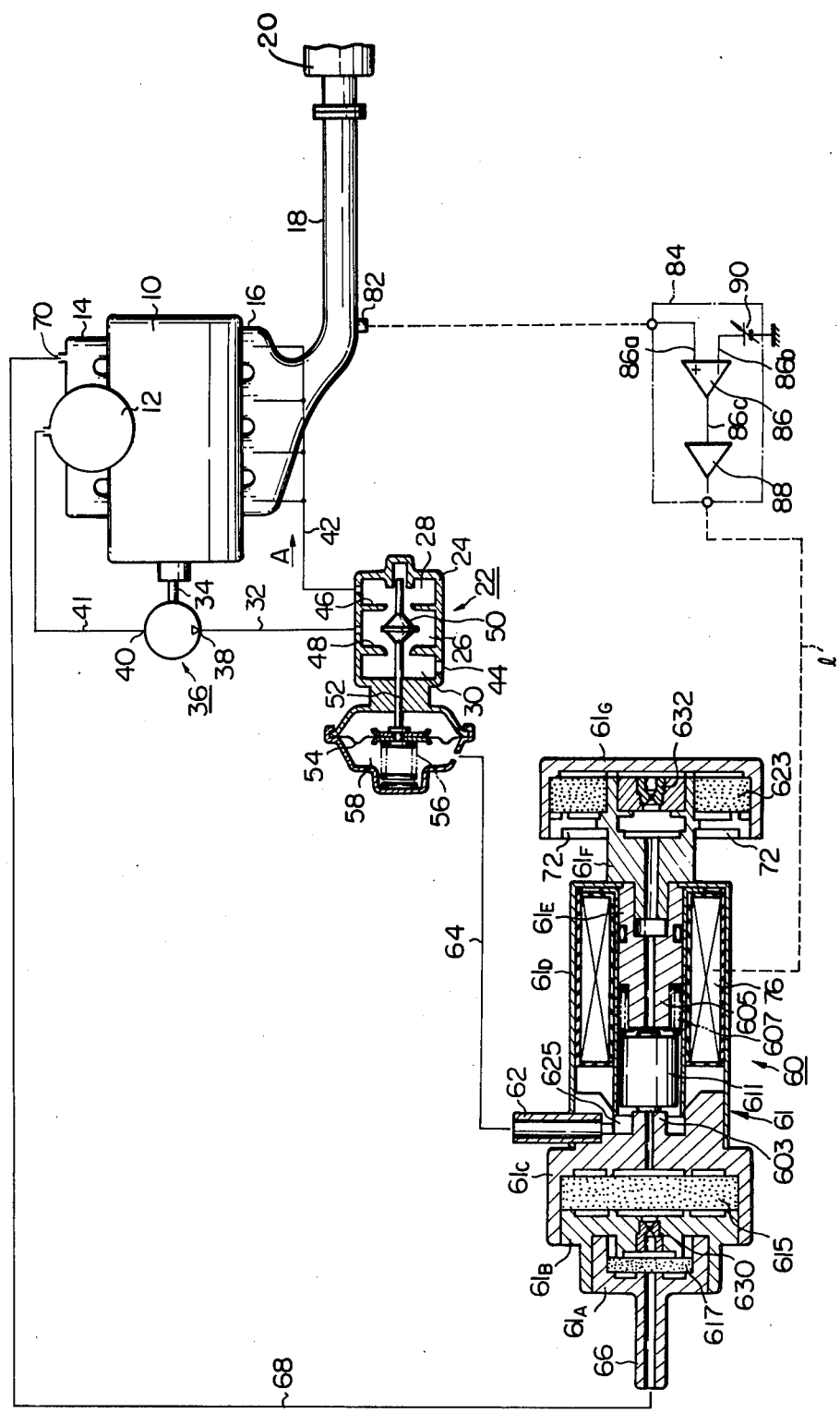

Iwata et al.

[11] 4,158,289

[45] Jun. 19, 1979

[54] ELECTROMAGNETIC VACUUM SWITCHING VALVE FOR USE IN AN EXHAUST GAS CLEANING APPARATUS

[75] Inventors: Minoru Iwata, Susono; Takeru Yasuda, Nagoya; Shyoichi Hagiwara, Aichi, all of Japan

[73] Assignees: Toyota Jidosha Kogyo Kabushiki Kaisha, Toyota; Aisan Industry Co., Ltd., Obu, both of Japan

[21] Appl. No.: 836,726

[22] Filed: Sep. 26, 1977

[30] Foreign Application Priority Data

Jul. 5, 1977 [JP] Japan .................... 52-79474

[51] Int. Cl.$^2$ .............................................. F01N 3/15
[52] U.S. Cl. .................................. 60/276; 60/290
[58] Field of Search .......................... 60/276, 290

[56] References Cited

U.S. PATENT DOCUMENTS 3,919,843  11/1975  Arnaud ........................ 60/290
3,962,867  6/1976   Ikeura ......................... 60/276

Primary Examiner—Douglas Hart
Attorney, Agent, or Firm—Stevens, Davis, Miller & Mosher

[57] ABSTRACT

An electromagnetic type vacuum switching valve adapted for connecting a vacuum actuator of an exhaust gas cleaning apparatus to a vacuum signal port in an intake manifold of an internal combustion engine or to the atmosphere. The valve is provided therein with an orifice means for controlling the rate of introducing the vacuum signal or the rate of introducing the atmospheric air pressure signal, and with a filter means for preventing dust in the atmosphere from entering into the engine.

3 Claims, 1 Drawing Figure

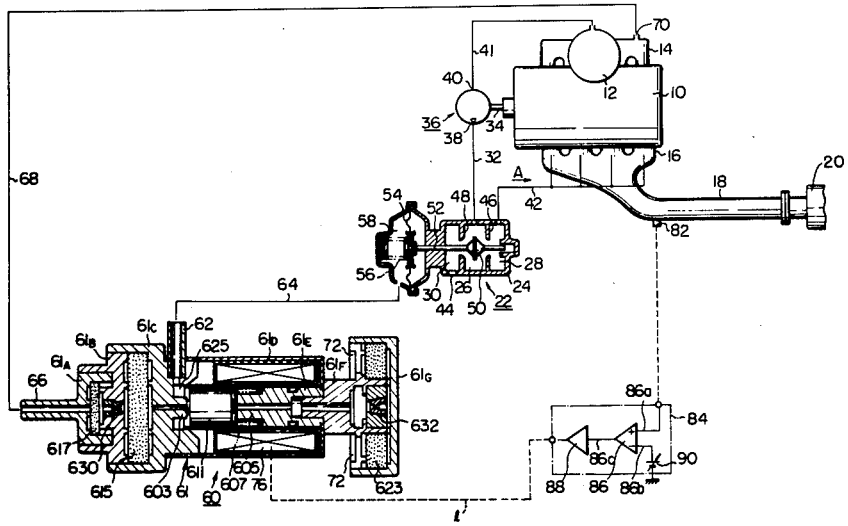

ELECTROMAGNETIC VACUUM SWITCHING VALVE FOR USE IN AN EXHAUST GAS CLEANING APPARATUS

FIELD OF THE INVENTION

The present invention relate to an electromagnetic type vacuum switching valve adapted for use in an exhaust gas cleaning apparatus of an internal combustion engine.

BACKGROUND OF THE INVENTION

Already known in the prior art is a three-way catalytic converter which can clean three major toxic components (HC, CO and $NO_x$) in the exhaust gas. The operation of the three-way catalytic converter is effectively attained when the exhaust gas is in a state wherein excess air as well as excess fuel is not left in the exhaust gas, i.e., the air-fuel ratio of the exhaust gas (the ratio of air remaining in the exhaust gas to fuel remaining in the exhaust gas) is maintained near the stoichiometric value.

For maintaining the air-fuel ratio near the stoichiometric value, an air injection system has been provided in the prior art for increasing or decreasing the amount of secondary air introduced into the exhaust manifold in accordance with electrical signals transmitted from an oxygen concentration-cell type air-fuel sensor, for example, an $O_2$ sensor which is arranged in an exhaust pipe of the engine.

In this system, an electromagnetic type vacuum switching valve, which cooperates with the signals transmitted from the $O_2$ sensor, is utilized.

SUMMARY OF THE INVENTION

An object of the present invention is to provide a novel structure for a vacuum switching valve which can be conveniently utilized in an exhaust gas cleaning apparatus for maintaining a constant ratio of the exhaust gas directed to a three-way catalytic converter in accordance with signals transmitted from an $O_2$ sensor.

According to the present invention a vacuum switching valve of an electromagnetic type adapted for use in an exhaust gas cleaning apparatus of an internal combustion engine is provided for selectively introducing a vacuum signal from the engine into the apparatus, such vacuum switching valve comprising:

a body provided with a first valve seat and a second valve seat, such body forming a first passageway adapted for connecting the first valve seat with an engine vacuum port formed in the intake system of the engine, and forming a second passageway adapted for connecting the second valve seat with the atmosphere;

a common port adapted for connecting a space formed in the body between the first valve seat and the second valve seat with the apparatus;

a valve member located between the first valve seat and the second valve seat;

a solenoid coil cooperable with the valve member in such a manner that the valve member can be moved between a first position in which the valve member is rested on the second valve seat and a second position in which the valve member is rested on the first valve seat;

a first orifice disposed in the first passageway for controlling the speed of transmitting a vacuum signal from the engine port into the first valve seat; and a second orifice disposed in the second passageway for controlling the speed of transmitting an atmospheric air pressure signal from the atmosphere into the second valve seat.

DESCRIPTION OF A PREFERRED EMBODIMENT

In a drawing showing an exhaust gas cleaning apparatus provided with a vacuum switching valve according to the present invention, numeral 10 designates an engine body of an internal combustion engine. Intake air is introduced into combustion chambers (not shown) in the engine body 10, via an air cleaner 12, a carburetor (not shown) and an intake manifold 14. Resultant exhaust gas produced by the combustion in the combustion chamber is introduced into an exhaust manifold 16. Connected to the exhaust manifold 16 is an exhaust pipe 18 in which a three-way catalytic converter 20 is disposed. As is well known to those skilled in this art, in order to effectively decrease the three known toxic components by means of the converter 20, it is necessary to maintain the air-fuel ratio of the exhaust gas directed into the converter 20 within a range near the stoichiometric ratio.

The reference numeral 22 designates a diaphragm-operated flow control valve adapted for controlling an amount of secondary air introduced into the exhaust manifold 16, so that the air-fuel ratio is kept near the stoichiometric ratio to effectively operate the three-way catalytic converter 20. The flow control valve 22 has a body 24 for forming three air chambers 26, 28 and 30. The common air chamber 26 is connected, via a secondary air pipe 32, to an outlet 38 of an air pump 36 driven by a crankshaft 34 of the engine 10. An inlet 40 of the air pump 36 is connected, via a secondary air pipe 41, to a purified space in the air cleaner 12. Therefore, a secondary air flow from the air cleaner 12 is introduced into the common chamber 26 by the operation of the air pump 36 due to the rotation of the crankshaft 34 of the engine 10. The chamber 28 is connected to branch pipes of the exhaust manifold 16 by an air injection pipe 42 to introduce the secondary air into the exhaust manifold 16. The chamber 30 is opened to the atmosphere via a vent hole 44 to discharge an excess amount of air therefrom. A valve seat 46 is formed between the chambers 26 and 28, and another valve seat 48 is formed between the chambers 26 and 30. A valve body 50 is located between the valve seats 46 and 48 for controlling the amount of secondary air directed to the chamber 28 from the common chamber 26. The valve member 50 is mechanically connected, via a rod 52, to a diaphragm 54 which is urged by a spring 56 toward the body 24. A vacuum signal chamber 58 is formed on one side of the diaphragm 54. When the chamber 58 is under a vacuum pressure, the diaphragm 54 is moved away from the body 24 and moved against the force of the spring 56. Thereby the position of the valve member 50 with respect to the valve seat 46 is varied in accordance with the level of vacuum pressure at the chamber 58. Accordingly, the amount of secondary air directed to the air injection pipe 42 via the valve seat 46 is controlled in accordance with the pressure level in the chamber 58.

An air-fuel ratio sensor 82 in the form of an oxygen concentration-cell, for example, an $O_2$ sensor, is arranged in the exhaust pipe 18. The sensor 82 operates to generate an electric signal in accordance with the difference between the concentrations of oxygen in the exhaust pipe 18 and in the atmosphere. When an excess amount of air remains in the exhaust pipe 18, in other words, when the air-fuel ratio of the exhaust gas is lean, the $O_2$ sensor 82 provides a low-level output signal $e_1$, since the difference in the oxygen concentrations between the exhaust pipe 18 and the atmosphere is small. When excess fuel remains in the exhaust pipe 18, in other words, when the air-fuel ratio of the exhaust gas is rich, the $O_2$ sensor 82 can provide a high level output signal $e_2$ because the oxygen concentration difference is high. As is clear from the above, the $O_2$ sensor 82 provides two output signals $e_1$ and $e_2$ in accordance with the air-fuel ratio of the exhaust gas.

The reference numeral 84 designates a control circuit including a comparator 86 and an amplifier 88. The comparator 86 has an input 86a connected to the $O_2$ sensor 82, and another input 86b connected to a battery. The voltage level at the input at the input 86b is adjusted so that it is between the levels $e_1$ and $e_2$. As a result, the comparator 86 provides an output signal at an output 86c when the signal of the high level $e_2$ is received by the input 86a from the $O_2$ sensor 82, due to the fact that the air-fuel ratio of the exhaust gas is smaller than the stoichiometric value, i.e., when the air-fuel ratio of the exhaust gas is rich. The comparator 86 provides no output signal at the output 86c when the low level signal $e_1$ is received by the input 86a, i.e., when the air-fuel ratio is lean.

The reference numeral 60 designates a vacuum switching valve of an electromagnetic type according to the present invention, adapted for controlling the vacuum level in the signal chamber 58 of the flow control valve 22. The vacuum switching valve 60 has a body 61 comprised of sections $61_A$, $61_B$, $61_C$, $61_D$, $61_E$, $61_F$ and $61_G$. The section $61_C$ forms a first valve seat 603, whereas the section $61_E$ forms a second valve seat 605. A valve member 611 is arranged between the valve seats 603 and 605 and urged by the spring 607 toward the valve seat 603. The first valve seat 603 communicates with a vacuum inlet 66 via passageways formed in the sections $61_C$, $61_B$ and $61_A$. The inlet 66 is connected to a vacuum port 70 formed in the intake manifold 14 of the engine via a vacuum tube 68. The second valve seat 605 is opened to air openings 72 via passageways formed in the sections $61_E$, $61_F$ and $61_G$. A common port 62 is, on one end thereof, opened to a chamber 625 formed in the body 61. The common port 62 is connected to the signal chamber 58 via a vacuum tube 64. A tubular-shaped solenoid coil 76 held by the section $61_D$ is located around the section $61_E$. When the solenoid 76 is energized, the valve 60 is in its first position in which the valve member 611 is moved by an electromagnetic force toward the valve seat 605 and against the spring 607, thus causing the valve member 611 to rest on the second seat 605. Thus the common port 62 is communicated with the vacuum inlet 66 for opening the signal chamber 58 to the vacuum port 70. Consequently, the vacuum force on the diaphragm 54 is increased, thereby moving the valve member 50 away from the valve seat 46. As a result, the amount of secondary air, directed to the air injection pipe 42, is increased as shown by the arrow A in the drawing.

When the solenoid 76 is de-energized, the valve 60 is its second position in which the valve member 611 rests on the first valve seat 603 by the force of the spring 607. The common port 62 is therefore opened to the air openings 72 thereby decreasing the vacuum force on the diaphragm 54. Thus, the valve member 50 is moved toward the valve seat 46, so that the amount of secondary air directed to the pipe 42 is decreased as shown by the arrow A in the drawing.

As shown in the drawing, solenoid 76 is connected to the control circuit 84 by an electrical line 1. Thus, when the rich signal $e_2$ from the $O_2$ sensor 82 is received by the control circuit 84, i.e., when the air-fuel ratio is lower than the stoichiometric value, the electromagnetic valve 60 is switched to its first position in order to increase the air-fuel ratio to the stoichiometric value. On the other hand, when the lean signal $e_1$ from the $O_2$ sensor 82 is received by the control circuit 84, i.e., when the air-fuel ratio is higher than the stoichiometric value, the valve 60 is now switched to its second position in order to decrease the air-fuel ratio to the stoichiometric value.

According to the present invention, a tubular member 630 forming a first orifice is arranged in the body section $61_B$ for controlling the speed of transmitting a vacuum pressure signal from the vacuum port 70 to the signal chamber 58, i.e., the rate of increasing the amount of secondary air directed into the pipe 42 as shown by the arrow A. Another tubular member 632 forming a second orifice is arranged in the body section $61_F$ for controlling the speed of transmitting an atmospheric air pressure signal from the atmosphere into the chamber 58, i.e., the rate of decreasing the amount of secondary air directed into the chamber 58.

A filter element 617 located between the section $61_A$ and $61_B$ and another filter element 615 located between the sections $61_B$ and $61_C$ operates to prevent dust in the chamber 625 from being introduced into the vacuum port 70. An annular filter element 623 operates to prevent dust in the atmosphere from being introduced into the side of chamber 625.

Since the orifice-forming members 630 and 632, and the filter members 615, 617 and 623 are respectively incorporated into the body 61 according to the present invention, a novel construction of the vacuum switching valve 60 is obtained. It is convenient to apply the novel construction to the exhaust gas cleaning apparatus. By using the vacuum switching valve of this novel construction, the cost for making the apparatus is decreased accordingly, and a compact structure of the apparatus can be obtained.

What is claimed is:

1. A vacuum switching valve of an electromagnetic type adapted for use in an exhaust gas cleaning apparatus of an internal combustion engine for selectively introducing a vacuum signal from an intake system of the engine into the apparatus, said vacuum switching valve comprising:
   a body provided with a first valve seat and a second valve seat, said body forming a first passageway adapted for connecting said first valve seat with an engine vacuum port formed in said intake system of said engine, and forming a second passageway adapted for connecting said second valve seat with an atmosphere;
   a common port adapted for connecting a space formed in said body between said first valve seat and said second valve seat with said exhaust gas cleaning apparatus;
   a valve member located between said first valve seat and said second valve seat;
   a solenoid coil cooperable with said valve member in such a manner that said valve member in switched between a first position in which said valve member rests on said second valve seat and a second position in which said valve member rests on said first valve seat;

a first orifice disposed in said first passageway for controlling the speed of transmitting a vacuum signal from said engine port into said first valve seat; and a second orifice disposed in said second passageway for controlling the speed of transmitting an atmospheric air pressure signal from the atmosphere into said second valve seat.

2. A vacuum switching valve according to claim 1, wherein said valve further comprises a first filter means located in said first passageway and a second filter means located in said second passageway.

3. An exhaust gas cleaning apparatus for an internal combustion engine, said apparatus comprising:

a three-way catalytic converter, arranged in the exhaust system of said engine, for effectively eliminating toxic components remaining in the exhaust gas when the air fuel ratio is kept near a stoichiometric value;

air pump means driven by the crankshaft of said engine;

pipe means connected, on one end thereof, to said air pump means for receiving secondary air from said pump means and connected, on the other end thereof, to said exhaust system at a position located upstream of said catalytic converter for introducing secondary air into said exhaust system;

a flow control valve disposed in said pipe means for controlling an amount of the secondary air directed toward said exhaust system via said pipe means, said valve having a diaphragm for forming a vacuum chamber on one side thereof, and the opening of said flow control valve being controlled in accordance with the vacuum pressure level in said vacuum chamber;

a vacuum switching valve of an electromagnetic type, which comprises: a body provided with a first valve seat, a second valve seat and with a common port; a spring-urged valve member located between said first valve seat and said second valve seat; and a solenoid coil arranged in said body, said solenoid coil causing said valve member to move between a first position, in which said valve member is seated on said second valve seat to cause said common port to communicate with said first valve seat when said solenoid coil is energized, and a second position, in which said valve member is seated on said first valve seat to cause said common port to communicate with said second valve seat, said body forming therein a first passageway connected to said first valve seat and a second passageway connected to said second valve seat;

pressure signal conduit means for connecting said common port with said vacuum chamber of said flow control valve;

vacuum signal conduit means for connecting said first passageway with an engine port formed in said intake system of said engine, said second passageway being opened to the atmosphere;

a sensor means arranged in said exhaust system for detecting a predetermined value of the air-fuel ratio of the exhaust gas;

a control unit for operating said solenoid of said electromagnetic valve in such a manner that said valve is in its first position when an electric signal, which indicates that the air fuel ratio is smaller than the predetermined value, is received by said unit to cause a vacuum signal from said engine port to be transmitted into said vacuum chamber via said vacuum signal conduit means, said first passageway, said first valve seat, said common port and said pressure signal conduit means for moving said diaphragm in a first direction to increase the amount of secondary air passed through said flow control valve, and in such a manner that said valve is in its second position when another electric signal, which indicates that the air-fuel ratio is larger than said predetermined value, is received by said unit to cause an atmospheric air pressure signal to be transmitted into said vacuum chamber via said second passageway, said second valve seat, said common port and said pressure signal conduit means for moving said diaphragm in a second direction opposite to said first direction to decrease the amount of secondary air passed through said flow control valve;

a first orifice disposed in said first passageway of said body for controlling the rate of movement of said diaphragm in said first direction to increase the amount of secondary air;

a second orifice disposed in said second passageway of said body for controlling the rate of movement of said diaphragm in said second direction to decrease the amount of secondary air;

first filter means located in said first passageway; and second filter means located in said second passageway.

* * * * *